United States Patent [19]

Douglas et al.

[11] Patent Number: 4,599,222

[45] Date of Patent: Jul. 8, 1986

[54] RECOVERY OF TUNGSTEN AND RHENIUM

[75] Inventors: Alan D. Douglas; Martin B. MacInnis; Kenneth T. Reilly, all of Towanda, Pa.

[73] Assignee: GTE Products Corporation, Stamford, Conn.

[21] Appl. No.: 728,649

[22] Filed: Apr. 29, 1985

[51] Int. Cl.$^4$ .................. C01G 41/00; C01G 47/00
[52] U.S. Cl. ........................ 423/49; 423/50; 423/55; 544/181
[58] Field of Search .................. 423/49, 50, 55; 544/181

[56] References Cited

U.S. PATENT DOCUMENTS 4,278,641 7/1981 Petrov et al. ............... 423/49
4,354,024 10/1982 Johnson et al. .............. 544/181

Primary Examiner—H. T. Carter
Attorney, Agent, or Firm—Donald R. Castle; L. Rita Quatrini

[57] ABSTRACT

A process is disclosed for recovering tungsten and rhenium from a relatively impure tungsten and rhenium solution. The process involves adjusting the pH of the solution to from about 9.0 to about 10.0 to precipitate impurities, and removing the impurities. The purified solution is adjusted to a pH of from about 0.5 to about 7.0 with a mineral acid. To the purified solution is added a solution containing sufficient hexamine to subsequently form a first hexamine tungsten solid containing the major portion of the tungsten. The hexamine solution is at essentially at the same pH as that of the pH adjusted purified solution. The resulting hexamine-tungsten-rhenium mixture is agitated at a sufficiently low temperature for a sufficient time to form the first solid and a first mother liquor containing the major portion of the rhenium. The first solid is separated from the first mother liquor.

A process is disclosed for accomplishing the above in which a relatively impure tungsten and rhenium solution is purified as above. A hexamine solution which is not pH adjusted is added to the purified solution followed by adjustment of the pH of the resulting hexamine-tungsten-rhenium mixture to about 0.5 to about 7.0 as described above to form a first solid containing the major portion of the tungsten and a first mother liquor containing the major portion of the rhenium, followed by removal of the first solid from the first mother liquor.

18 Claims, No Drawings

RECOVERY OF TUNGSTEN AND RHENIUM

BACKGROUND OF THE INVENTION

This invention relates to a process for recovering tungsten and rhenium from a relatively impure tungsten and rhenium solution. More, particularly, it relates to a process for recovery of tungsten and rhenium from an impure solution by removing the tungsten from the solution as a solid with hexamine.

In a process for recovering the metal values from tungsten-rhenium alloy scrap, an alkaline solution containing sodium tungstate and sodium perrhenate is generally formed. A separation of the two metals is necessary before purification and metal preparation steps can be initiated.

Prior separation techniques include extraction of rhenium by means of a strongly basic ion exchange resin, precipitation of tungstic acid, and the preferential volatilization of rhenium heptoxide.

Disadvantages of the ion exchange method include the difficulty of stripping rhenium from the resin, the inefficiency of separation should a high concentration of certain ions such as chloride be present, and the necessity of having large scale specialized equipment available.

Disadvantages of the tungstic acid technique include an incomplete precipitation of tungsten under desired operating conditions, leaving an appreciable tungsten content in the rhenium portion and the requirement of production equipment suitable for handling very corrosive hot hydrochloric acid needed for the tunstic acid precipitation process.

The process for oxidizing the scrap and subliming the rhenium heptoxide has the disadvantage of incomplete removal of the rhenium from the tungstic oxide, and the requirement of specialized furnace equipment to be designed and built.

A process for efficiently recovering rhenium and tungsten without specialized equipment would be an advancement in the art.

SUMMARY OF THE INVENTION

In accordance with one aspect of this invention, there is provided a process for recovering tungsten and rhenium from a relatively impure tungsten and rhenium solution. The process involves adjusting the pH of the relatively impure solution to from about 9.0 to about 10.0 to precipitate impurities contained therein and form a purified solution, the pH adjustment from a value below about 9.0 being done with a base and from a value above about 10.0 being done with a mineral acid, and separating the impurities from the purified solution. The pH of the purified solution is adjusted to from about 0.5 to about 7.0 with a mineral acid. To the resulting pH adjusted purified solution is added a solution containing sufficient hexamine to subsequently form a first hexamine tungsten solid containing the major portion of the tungsten, the hexamine solution being at essentially the same pH as that of the pH adjusted purified solution. The resulting hexamine-tungstenrhenium mixture is agitated at a sufficiently low temperature for a sufficient time to form the first hexamine tungsten solid and a first mother liquor containing the major portion of the rhenium. The first solid is separated from the first mother liquor.

In accordance with another aspect of this invention, there is provided a process for recovering tungsten and rhenium from a relatively impure tungsten and rhenium solution. The process involves adjusting the pH of the relatively impure solution to from about 9.0 to about 10.0 to precipitate impurities contained therein and form a purified solution, the pH adjustment from a value below about 9.0 being done with a base and from a value above about 10.0 being done with a mineral acid, and separating the impurities from the purified solution. To the purified solution is added a solution containing sufficient hexamine to subsequently form a first hexamine tungsten solid containing the major portion of the tungsten. The pH of the resulting hexamine-tungsten-rhenium mixture is adjusted to from about 0.5 to about 7.0 with a mineral acid while the mixture is agitated at a sufficiently low temperature and for a sufficient time to form the first hexamine tungsten solid and a first mother liquor containing the major portion of the rhenium. The first solid is separated from the first mother liquor.

DETAILED DESCRIPTION OF THE INVENTION

For a better understanding of the present invention, together with other and further objects, advantages, and capabilities thereof, reference is made to the following disclosure and appended claims in connection with the foregoing description of some of the aspects of the invention.

By the process of this invention, tungsten and rhenium are recovered from a tungsten and rhenium bearing solution by treating the solution with hexamine to precipitate the tungsten as a hexamine tungsten compound leaving the rhenium in solution.

In general, any tungsten and rhenium solution can be used as the starting solution. However, the tungsten and rhenium solution is generally an alkali metal solution which is obtained by fusion of tungsten and rhenium bearing material such as oxidized alloy scrap with an alkali metal hydroxide, in particular sodium hydroxide.

The solution concentration is generally from about 1 to about 120 and preferably from about 80 to about 120 grams of W per liter, and from about 0.2 to about 12 and preferably from about 2 to about 3 grams of Re per liter. Generally impurities such as silicon, aluminum, iron, zinc, boron, and calcium, etc. are present.

The starting relatively impure solution is first adjusted to a pH of from about 9.0 to about 10.0, and preferably about 9.5 to precipitate a portion of the impurities. If the solution is initially at a pH of less than about 9.0, a base, preferably an alkali metal hydroxide, and most preferably sodium hydroxide is used to make the pH adjustment. If the pH of the solution is initially greater than about 10.0, a mineral acid is used to make the pH adjustment. The mineral acid for this pH adjustment and for all subsequent pH adjustments with a mineral acid can be hydrochloric acid or sulfuric acid. Hydrochloric acid is preferred because it simplifies the subsequent recovery process for rhenium.

The impurities are then separated from the resulting purified solution by any standard technique such as filtration.

The purified solution is then adjusted to a pH of from about 0.5 to about 7.0 and preferably about 2.5 with a mineral acid of the type described previously.

At this point, if any insoluble material forms, it is removed from the resulting pH adjusted purified solution by any standard technique such as filtration.

An aqueous solution of hexamine is prepared at any convenient concentration but generally at from about 100 to about 400 grams of hexamine per liter. The solution contains from about 0.4 moles to about 5.0 moles of hexamine per mole of tungsten in the purified solution. This amount is sufficient to subsequently form a first solid of hexamine and tungsten which contains the major portion of the tungsten.

The pH of the hexamine solution is adjusted to the same pH as that of the pH adjusted purified solution which is in the range of from about 0.5 to about 7.0 and preferably about 2.5. A mineral acid of the type described previously is used to adjust the pH.

The resulting pH adjusted hexamine solution is then added slowly to the pH adjusted purified solution which is preferably well agitated. The slow addition and agitation allows the hexamine tungsten compound to form slowly and to grow in particle size without occluding the solubilized rhenium. The resulting hexamine-tungsten-rhenium mixture is agitated at a sufficiently low temperature preferably below about 20° C. for a sufficient time, preferably at least about 6 hours to form a first hexamine tungsten solid which contains the major portion of the tungsten and a first mother liquor which contains the major portion of the rhenium.

The first solid is then separated from the first mother liquor by any standard technique such as filtration.

The first solid can be further processed to obtain material suitable for hydrogen reduction to tungsten powder or to obtain other tungsten products. By roasting in air at temperatures of from about 400° C. to about 750° C., the organic portion of the hexamine tungsten solid is decomposed and volatilized leaving tungstic oxide. The hexamine tungsten solid can be treated with dilute ammonium hydroxide and heated at about boiling to form ammonium paratungstate.

If necessary, the first solid can be further purified by dissolution in ammonium hydroxide at a pH of from about 7.5 to about 9.5. The pH of the resulting solution is then adjusted to from about 0.5 to about 7.0, and preferably to about 2.5 with a mineral acid of the type described previously to form a second hexamine tungsten solid and a second mother liquor.

The second solid is then separated from the second mother liquor by any standard technique such as filtration.

The first mother liquor containing the major portion of the rhenium as perrhenate can be further processed to obtain the rhenium values by known methods as precipitation of rhenium heptasulfide, or conversion to and crystallization of perrhenate salts such as ammonium perrhenate or potassium perrhenate.

A second method of recovering tungsten and rhenium from a relatively impure tungsten and rhenium solution involves adjusting the pH and removing impurities to form a purified tungsten and rhenium solution as according to the method described previously.

A hexamine solution is prepared according to the method described previously but without any pH adjustment.

The hexamine solution is then added to the purified solution according to the method described previously.

The resulting hexamine-tungsten-rhenium mixture is adjusted to a pH of from about 0.5 to about 7.0 and preferably about 2.5 with a mineral acid of the type described previously.

The resulting pH adjusted mixture is then agitated under the conditions of temperature and length of time as described previously to form a first hexamine tungsten solid.

The balance of the procedure is the same as that described previously. To more fully illustrate this invention, the following non-limiting example is presented. All parts, portions, and percentages are on a weight basis unless otherwise stated. Example To a sodium tungstate solution containing about 22 parts of tungsten and about 0.72 parts of rhenium, having a concentration of about 110 grams of W per liter and about 3.6 grams of Re per liter at a pH of about 11.4 is added about 68 parts of concentrated hydrochloric acid to adjust the pH to about 9.4 and precipitate some impurities. The solution is then cooled to about 20° C. and filtered to remove the solid impurities. A hexamine solution is prepared by dissolving about 13.4 parts of hexamine in about 121 parts of water. The pH of the hexamine solution is about 9.07. The hexamine solution is then added to the tungsten and rhenium solution to give a pH of about 9.4. About 34.7 parts of concentrated hydrochloric acid is added to adjust the pH to about 2.5. A heavy white solid forms. The solid-liquid mixture is placed in a cool water bath and stirred and cooled to about 16° C. for about 15 hours. The solid is then removed from the mixture by filtration. The resulting mother liquor contains about 0.61 parts of rhenium which is about 85% of the starting rhenium and about 0.88 parts of tungsten which is about 4% of the starting tungsten, the major part of the tungsten being in the white solid.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for recovering tungsten and rhenium from a relatively impure tungsten and rhenium solution, said process comprising:
   (a) adjusting the pH of said relatively impure solution to from about 9.0 to about 10.0 to precipitate impurities contained therein and form a purified tungsten and rhenium solution, the pH adjustment from a value below about 9.0 being done with a base, and from a value above about 10.0 being done with a mineral acid;
   (b) separating said impurities from the purified solution;
   (c) adjusting the pH of the purified solution to from about 0.5 to about 7.0 with a mineral acid;
   (d) adding to the pH adjusted purified solution a solution containing sufficient hexamine to subsequently form a first hexamine tungsten solid containing the major portion of the tungsten, the hexamine solution being at essentially the same pH as that of said pH adjusted purified solution;
   (e) agitating the resulting hexamine-tungsten-rhenium mixture at a sufficiently low temperature and for a sufficient time to form a first hexamine tungsten solid containing the major portion of the tungsten and a first mother liquor containing the major portion of the rhenium; and
   (f) separating said first solid from said first mother liquor.

2. A process according to claim 1 comprising the additional steps:

(a) dissolving said first hexamine tungsten solid in ammonium hydroxide at a pH of from about 7.5 to about 9.5;

(b) adjusting the pH of the resulting ammoniacal solution to from about 0.5 to about 7.0 with a mineral acid to form a second hexamine tungsten solid and a second mother liquor; and (c) separating said second hexamine tungsten solid from said second mother liquor.

3. A process according to claim 1 wherein said base is an alkali metal hydroxide.

4. A process according to claim 3 wherein said alkali metal hydroxide is sodium hydroxide.

5. A process according to claim 1 wherein the mineral acid is hydrochloric acid.

6. A process according to claim 1 wherein from about 0.4 moles to about 5.0 moles of hexamine are added per mole of tungsten in the purified solution.

7. A process according to claim 1 wherein said purified solution and said hexamine solution are each adjusted to a pH of about 2.5.

8. A process according to claim 1 wherein the hexamine-tungsten-rhenium mixture is agitated at below about 20° C. for at least about 6 hours.

9. A process according to claim 2 wherein said ammoniacal solution is adjusted to a pH of about 2.5.

10. A process for recovering tungsten and rhenium from a relatively impure tungsten and rhenium solution, said process comprising:

(a) adjusting the pH of said relatively impure solution to from about 9.0 to about 10.0 to precipitate impurities contained therein and form a purified tungsten and rhenium solution, the pH adjustment from a value below about 9.0 being done with a base and from a value above about 10.0 being done with a mineral acid;

(b) separating said impurities from the purified solution;

(c) adding to the purified solution a solution containing sifficient hexamine to subsequently form a first hexamine tungsten solid containing the major portion of the tungsten;

(d) adjusting the pH of the resulting hexamine-tungstenr-henium mixture to from about 0.5 to about 7.0 with a mineral acid while agitating the mixture at a sufficiently low temperature and for a sufficient time to form a first hexamine tungsten solid containing the major portion of the tungsten and a first mother liquor containing the major portion of the rhenium; and (e) separating said first solid from said first mother liquor.

11. A process according to claim 10 comprisng the additional steps:

(a) dissolving said first solid in ammonium hydroxide at a pH of from about 7.5 to about 9.5;

(b) adjusting the pH of the resulting ammoniacal solution to from about 0.5 to about 7.0 with a mineral acid to form a second hexamine tungsten solid and a second mother liquor; and (c) separating said second solid from said second mother liquor.

12. A process according to claim 11 wherein said ammoniacal solution is adjusted to a pH of about 2.5.

13. A process according to claim 10 wherein the base is an alkali metal hydroxide.

14. A process according to claim 13 wherein said alkali metal hydroxide is sodium hydroxide.

15. A process according to claim 10 wherein the mineral acid is hydrochloric acid.

16. A process according to claim 10 wherein from about 0.4 moles to about 5.0 moles of hexamine are added per mole of tungsten in the purified solution.

17. A process according to claim 10 wherein said hexamine-tungsten-rhenium mixture is adjusted to a pH of about 2.5.

18. A process according to claim 10 wherein the hexamine-tungsten-rhenium mixture is agitated below about 20° C. for at least about 6 hours.

* * * * *